United States Patent [19]

Nakagawa et al.

[11] Patent Number: 4,841,430

[45] Date of Patent: Jun. 20, 1989

[54] METHOD OF TEACHING A PATH TO A MOVING BODY

[75] Inventors: Toru Nakagawa; Hitoshi Kubota; Yasuo Sakurai, all of Osaka, Japan

[73] Assignee: Matsushita Electric Industrial Co., Ltd., Japan

[21] Appl. No.: 904,844

[22] Filed: Sep. 5, 1986

[30] Foreign Application Priority Data

Sep. 5, 1985 [JP] Japan ................. 60-196267

[51] Int. Cl.[4] ............................... G06F 15/46
[52] U.S. Cl. ................. 364/167.01; 364/191; 364/474.31; 364/513; 318/573
[58] Field of Search ........... 364/513, 167, 168, 169, 364/191–193; 318/573; 901/3

[56] References Cited

U.S. PATENT DOCUMENTS

| | | | |
|---|---|---|---|
| 3,806,713 | 4/1974 | Ryberg ....................... | 364/169 |
| 4,164,693 | 8/1979 | Leenhouts .................. | 318/573 |
| 4,263,538 | 4/1981 | Richiardi ................... | 318/568 |
| 4,423,481 | 12/1983 | Reid-Green et al. ........ | 364/167 |
| 4,506,331 | 3/1985 | Kishi et al. ................ | 364/191 |
| 4,581,698 | 4/1986 | Jaswa ....................... | 364/169 |
| 4,648,024 | 3/1987 | Kato et al. ................ | 364/169 |
| 4,663,726 | 5/1987 | Chand et al. ............... | 364/513 |
| 4,736,295 | 4/1988 | Lachiver et al. ........... | 364/169 |

FOREIGN PATENT DOCUMENTS

56-114685 9/1981 Japan.
58-176705 10/1983 Japan.

Primary Examiner—John R. Lastova
Attorney, Agent, or Firm—Lowe, Price, LeBlanc, Becker & Shur

[57] ABSTRACT

Disclosed is a method of teaching a moving part to trace a path, the method comprising the steps of determining a curved condition of the teaching path on the basis of a difference between a path length and a straight distance from a first point to a second point on the teaching path and an angle made by the first and second points and a third point, and selectively storing the first, second and third points in accordance with the results of the determination. The first, second and third points are stored as path data in a memory when the difference is greater than a reference length and the angle is smaller than a reference angle. On the other hand, the first and second points are stored therein when the difference is greater than the reference length and the angle is greater than the reference angle.

19 Claims, 7 Drawing Sheets

PRIOR ART

METHOD OF TEACHING A PATH TO A MOVING BODY

FIELD OF INVENTION

The present invention relates generally to a method of determining path points to be stored for controlling a moving body, and more particularly to a method of sequentially storing points for controlling movement of a body along a predetermined path wherein sampled path points are selected and stored in response to predetermined relations of three points defining distances and angles along the path. This invention is particularly suitable, but not exclusively, for industrial robots.

BACKGROUND OF THE INVENTION

A known method of teaching an industrial robot part such as an arm to transverse a path uses a control unit for successively storing points indicative of the moving part path. The points are derived at predetermined travelling distance intervals or at predetermined time intervals. In playback, the control unit controls the moving part in accordance with the stored points to trace the path made by the moving part. However, since such a teaching method involves moving the moving part linearly between the stored points, the interval must be relatively short to provide the required tracing precision. This results in a large capacity memory requirement.

A known technique for eliminating such a large capacity memory problem is disclosed in Japanese Patent Provisional Publication No. 56-114685, that includes a control unit for storing a subsequent point Pn+1 when the moving robot part position is greater than a predetermined distance from an extension of a straight line between a presently stored point Pn and a previously stored point Pn−1. While successfully avoiding the above-noted problem for a movement path having many straight portions because the point is not stored when the moving part travels substantially along a straight line, this technique is not well adapted for a path having complex portions such as curved portion.

Another approach for eliminating the large capacity problem is disclosed in Japanese Patent Provisional Publication No. 58-176705 having a temporary memory for temporarily simultaneously storing a present point Pn and an angle between a first straight line that connects point Pn with a previously stored point Pn−1 and a second straight line that connects point Pn−1 and a stored point Pn−2 derived prior to point Pn−1. Initial point P1, present point Pn and an intermediate point therebetween are supplied as path data from the temporary memory to a main memory when the angle results in a predetermined condition. Although satisfactory for a path having many curved portions, this prior art technique is disadvantageous for a path that does not have complex portions because the temporary memory must store a large amount of data and thus must have a large capacity.

SUMMARY OF THE INVENTION

It is therefore an object of the present invention to provide a method of storing a moving body path, which method is capable of effectively reducing the capacity of a storage device for the path concurrently with maintaining substantial playback precision.

This object is attained by determining a curved condition of a teaching path on the basis of a difference between path length between first and second points on the path and a straight line between the first and second points and an angle made by a first straight line connecting the first and second points and a second straight line connecting the second point and a third point on the line, and selectively storing the first, second and third points in accordance with the results of the determination.

In accordance with a first preferred embodiment of the present invention, the first, second and third points are stored as path data in a memory when said length difference is greater than a reference length and said angle between the lines is smaller than a reference angle. On the other hand, the first and second points are stored, to the exclusion of the third point, when said length difference is greater than the reference length and said angle is greater than the reference angle.

In accordance with a second preferred embodiment of the present invention, the first point is stored as path data in a memory when said angle is greater than a reference angle and said length difference is greater than a reference length. On the other hand, none of the first, second and third points is stored when the angle is smaller than the reference angle.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
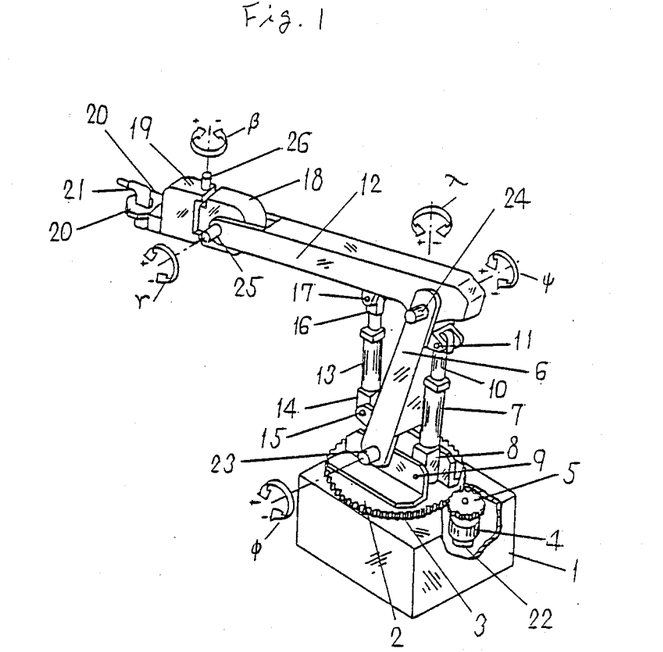
FIG. 1 is an illustration of an industrial robot for which the present invention is employed.

Referring now to FIG. 1, there is illustrated an industrial robot for which the present invention is employed. The industrial robot comprises a base 1 on which a motor 4 is fixedly secured and a rotatable table 2 having circumferential teeth 3. The motor 4 is directly coupled to a pinion gear 5 which in turn engages the teeth 3 the rotational so that the rotational table 2 rotates about the axis of rotation thereof in the direction indicated by the reference λ. A first arm 6 is pivotally connected to the rotational table 2 by means of a pin (not shown) and is swingable by the aid of a hydraulic pressure actuator 7 in the direction indicated by the reference φ. A head portion 8 of the actuator 7 is pivotally connected to the rotational table 2 by a pin 9 and a rod 10 thereof is pivotally connected to the first arm 6 by a pin 11. The first arm 6 is further pivotally connected to a second arm 12 by means of a pin (not shown). Also provided is a hydraulic pressure actuator, having a head portion 14 pivotally coupled to the first arm 6 by a pin 15 having a rod 16 pivotally coupled to the second arm 12 by a pin 17 whereby the second arm 12 is movable in the direction indicated by the reference $\psi$ in response to the hydraulic pressure actuator 13. A first swinging motor 18 at an end of the send arm 12, has a horizontally swinging shaft that rotates in the direction indicated by the reference $\gamma$. Connected to the first swinging motor 18 is a second swinging motor 19 having a vertically swinging shaft at right angles to the swinging shaft of the first swinging motor 18 and swinging in the direction indicated by the reference $\beta$. The second swinging motor 19 has a pair of fingers 20 for holding a sealing-material applying gun 21. Further included in the industrial robot are position detecors 22, 23, 24, 25 and 26 for respectively detecting the angular position of the rotational table 2 with respect to the base 1, the angular position of the first arm 6 with respect to the rotational table 2, the angular position of the second arm 12 relative to the first arm 6, the angular position of the first swinging motor 18 relative to the second arm 12, and the angular position of the second swinging motor 19 with respect to the first swinging motor 18.

Figure 2:
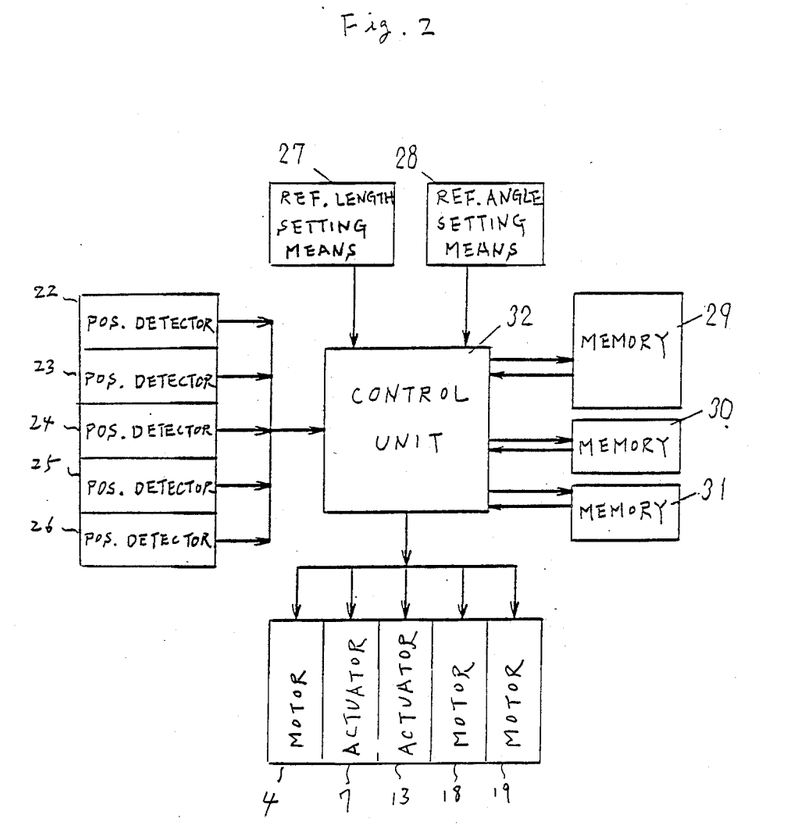
FIG. 2 is a schematic block diagram of a path teaching apparatus for a first embodiment of this invention.
Figure 3:
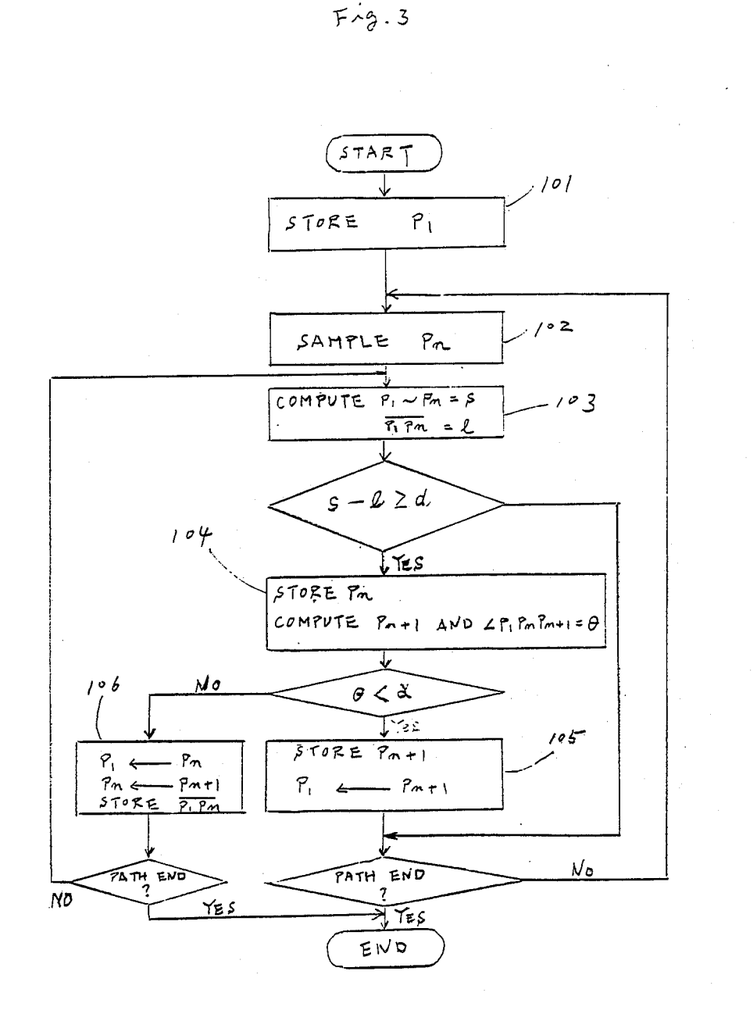
FIG. 3 is a flow chart for the programmed operation of the first embodiment.

FIG. 2 is a schematic block diagram of one example of a path teaching apparatus for the first embodiment of the present invention and FIG. 3 is a flow chart useful for describing the programmed steps of a control unit 32 of FIG. 2 according to the first embodiment of this invention.

The control unit 32, or microcomputer, first writes the initial position or basic point P1, of the applying gun 21 into a memory 29 in response to outputs of the position detectors 22 to 26 (step 101), and then samples the present position Pn thereof (step 102). Thereafter, the control unit 32 reads the position data corresponding to the earliest point (i.e., P1 here) from the memory 29 to calculate a straight line distance l between the points P1 and Pn. Here, the present point Pn is indicative of $n^{th}$ sample point from the point P1, and the sampling is made at predetermined travelling distance intervals, i.e. whenever the applying gun 21 moves by a predetermined distance. Furthermore, the control unit 32 reads the position data corresponding to the sampled point Pn−1 immediately before the point Pn from a memory 31 which stores the position point sampled immediately before the present point Pn, and then computes the length S' of the path between the points P1 and Pn−1. The path length S' may be the straight distance therebetween. The length S' is added to the path length S between the sampled points P1 and Pn−1 which has been stored in a memory 30 and read therefrom in response to a command from the control unit 32. The sum of the length S' and the length S is stored in the memory 30 as the path length between the sampled points Pl and Pn, that is, the length S of the path of the applying gun 21 is updated at every sampling point. At the same time, the position data relating to the presently sampled point Pn is stored in the memory 31 (step 103).

The updated path length S is subtracted from the calculated distance l and the difference therebetween is compared with a reference length d derived from a reference length setting means 27. $S^n-1^n$ is compared with $d^n$. If the difference is equal to or greater than the reference length d, the present point Pn of the moving body, i.e., applying gun 21, is stored in the memory 29 as the point second to the point P1 and the memory 30 is reset to zero condition. Furthermore, when the applying gun 21 moves from the point Pn and reaches the next sampling point Pn+1, the control unit 32 computes the position of the sampling point Pn+1 in response to the outputs of the position detectors 22 to 26 and computes an angle $\theta$ between the straight line that connects the point P1 with the point Pn and the straight line that connects the point Pn with the point Pn+1(step 104). If the angle $\theta$ therebetween is smaller than a reference angle $\alpha$ set, stored and derived by a reference angle setting means 28, the point Pn+1 is stored in the memory 29 as the point second to the point Pn and as a newly basic point P1 (step 105). On the other hand, if the angle $\theta$ therebetween is greater than the reference angle $\alpha$, the point Pn is set as a basic point P1 and the point Pn+1 is set as a presently positioned point Pn, and futher a length of the path between the points Pn and Pn+1 is calculated and stored in the memory 30 (step 106). The above-mentioned operation is repeatedly performed, and the point Pn is stored in the memory 29 when the difference between the path length S and the straight distance l becomes greater than the reference length d. The next point Pn+1 with respect to the stored point Pn is stored in the memory 29 when the angle $\theta$ is smaller than the reference angle $\alpha$. The comparison of angle $\theta$ with reference angle $\alpha$ is made using a trigonometric function.

The position of the end of the applying gun 21 is represented by coordinates Xn, Yn and Zn on a rectangular coordinate system on the basis of the outputs a, b, c, d, and e of the position detectors 22 to 26 as follows.

$$\begin{bmatrix} Xn \\ Yn \\ Zn \end{bmatrix} = A \cdot \begin{bmatrix} a \\ b \\ c \\ d \\ e \end{bmatrix}$$

On the other hand, the values corresponding to the outputs of the position detectors 22 to 26 are obtained from the coordinates Xn, Yn and Zn on the rectangular coordinate system as follows.

$$\begin{bmatrix} a \\ b \\ c \\ d \\ e \end{bmatrix} = A^{-1} \cdot \begin{bmatrix} Xn \\ Yn \\ Zn \end{bmatrix}$$

where A is a matrix determined in accordance with the arrangement of an industrial robot, and $A^{-1}$ is an inverse matrix.

The angle $\theta$ between the straight line that connects the point P1 with the point Pn and the straight line that connects the point Pn with the point Pn+1 can be derived from sets of X, Y, Z coordinates corresponding to the points P1, Pn, and Pn+1.

Figure 4:
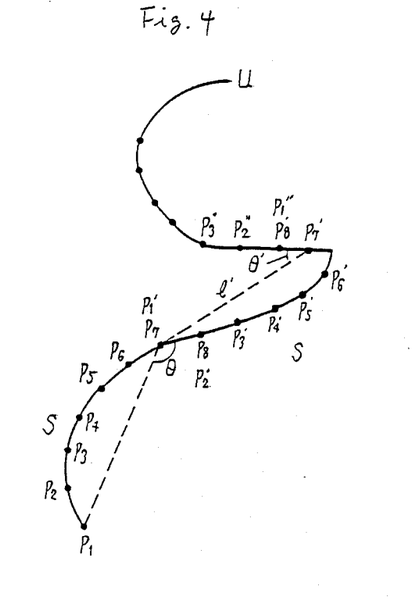
FIG. 4 is a graphic illustration of the first embodiment in detail.

A detailed description of this embodiment is made with reference to FIG. 4 in which the reference u is a teaching path.

When the end of the applying gun 21 lies at a start point P1, the position data relating to the start point P1 is first stored in the memory 29, at this time the memory 30 is reset to the zero condition and the position data relating to the start point P1 is written in the memory 31. When the applying gun reaches a point P2, the control unit 32 reads the data relating to the point P1 from the memory 29 to compute a straight distance $\overline{P1P2}$ (=l) between the points P1 and P2. Furthermore, the data relating to the point P1 is read from the memory 31 to calculate a straight distance $\overline{P1P2}$ (=S') which is in turn stored in the memory 30 as an initial path length S. The content of the memory 31 is rewritten with the data relating to the point P2. At this time, the path length S is equal to the straight distance l and therefore the point P2 is not stored. When point P3 is reached, the earliest point P1 is read from the memory 29 to compute a straight distance P1P3 (=l) between the points P1 and P3, and the data relating to the point P2 is read from the memory 31 to calculate a straight distance $\overline{P2P3}$ (=S') which is in turn added to the path length S stored in the memory 30. The sum thereof is stored in the memory 30 as a new path length S, and the memory contents are rewritten with the data relating to the point 30. Here, since the difference between the path length S and straight distance is smaller than the reference length d, the data corresponding to the point P3 is not stored in the memory 29. As long as the applying gun 21 moves from the point P3 to a point P6, the difference is still smaller than the reference length d and therefore the data relating to the points P4 to P6 is not stored therein. However, the contents of the memories 30 and 31 are similarly updated in accordance with the movement of the applying gun 21.

At a point P7, similarly, the data relating to the point P1 is read from the memory 29 to compute a straight distance $\overline{P1P7}$ (=l), and the data relating to the point P6 is read from the memory 31 to calculate a straight distance $\overline{P6P7}$ (=S') between the points P6 and P7 which in turn added to the path length S stored in the memory 30. The content of the memory 31 is rewritten with the data corresponding to the point P7. At this time, the difference between the path length S and the straight distance P1P7 becomes greater than the reference length d, causing the point P7 to be stored in the memory 29 as a point second to the point P1. When reaching the next point P8, the control unit 32 computes an angle $\theta$ ($\angle$P1P7P8) between the straight line that connects the point P1 with the point P7 and the straight line that connects the point P7 with the point P8. Because angle $\theta$ is greater than the reference angle $\alpha$ obtained by the reference angle setting means 28 point P8 is not stored and the straight distance $\overline{P7P8}$ (=S') is calculated and stored in the memory 30 as a new path length S.

Thereafter, the point P7 is set as a new initial point P'1 and the above operation is repeatedly performed. When the applying gun 21 reaches a point P'7, the difference between a path length S and a straight distance l from the point P'1 to the point P'7 becomes greater than the reference length d, causing point P'7 to be stored in the memory 29. Subsequently, when moving up to a point P'8, an angle $\theta'$ ($\angle$P'1P'7P'8) between the straight line that connects the point P'1 with the point P'7 and the straight line that connects the point P'7 with the point P'8 becomes smaller than the reference angle $\alpha$, causing point P'8 to be stored in the memory 29. At this time, the point P'8 is written in the memory 31 and the memory 30 is reset to the zero condition. The point data stored in the memory 29 is used as path data in playback.

Coordinates (X, Y, Z) on a rectangular coordinate system or outputs (a, b, c, d, e) of the position detectors 22 to 26 are employed for storage of the points.

In playback, Akima's method or one-dimentional quasi-cubic bermite interpolation is employed for interpolation with respect to the path data; Akima's method being disclosed in "NUMERICAL CALCULATION METHOD" written by Hideyo Nagashima and published by MAKI. When a teaching points comprise the start point and the end point, the linear interpolation is employed. On the other hand, when there are three teaching points, the arc interpolation may be used.

Figure 5A:
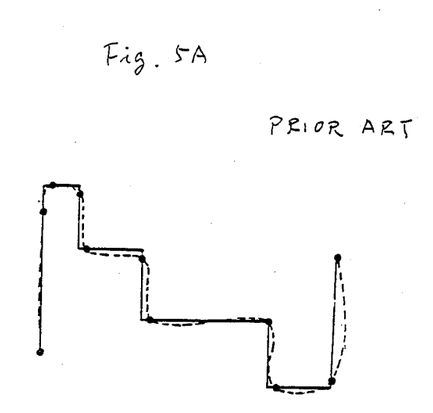
FIGS. 5A and 5B are graphic diagrams respectively illustrating the relation between a teaching path and traced path, with FIG. 5A being a diagram of a result obtained in accordance with a conventional teaching method and FIG. 5B being a diagram of a result obtained in accordance with the first embodiment of this invention.
Figure 5B:
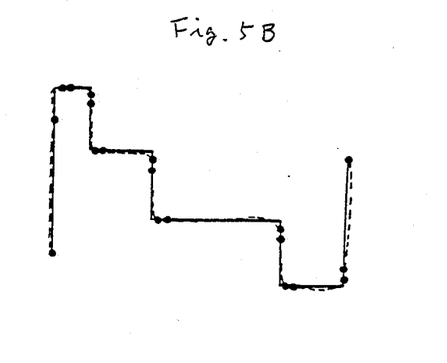

FIGS. 5a and 5B are graphs respectively illustrating the relation between a teaching path and a traced path where the teaching path is indicated by a solid line and the traced path is indicated by a dotted line. In FIG. 5A is shown a result obtained in accordance with a conventional teaching method, and in FIG. 5B is illustrated the path in accordance the FIG. 4 embodiment, wherein there is a comparison between the angles $\theta$ and $\alpha$ in the vicinity of curved portions of the teaching path. The comparison provides two teaching points in the vicinity thereof. It will be understood from the figures that this embodiment provides a satisfactory interpolation result compared with the conventional case of FIG. 5A.

According to this embodiment, only two teaching points are stored between the points P1 and Pn or three teaching points are stored between the points P1 and Pn+1 so it is possible to reduce storage capacity. In addition, as described above, it is also possible to trace a teaching path with a relatively high accuracy.

Figure 6:
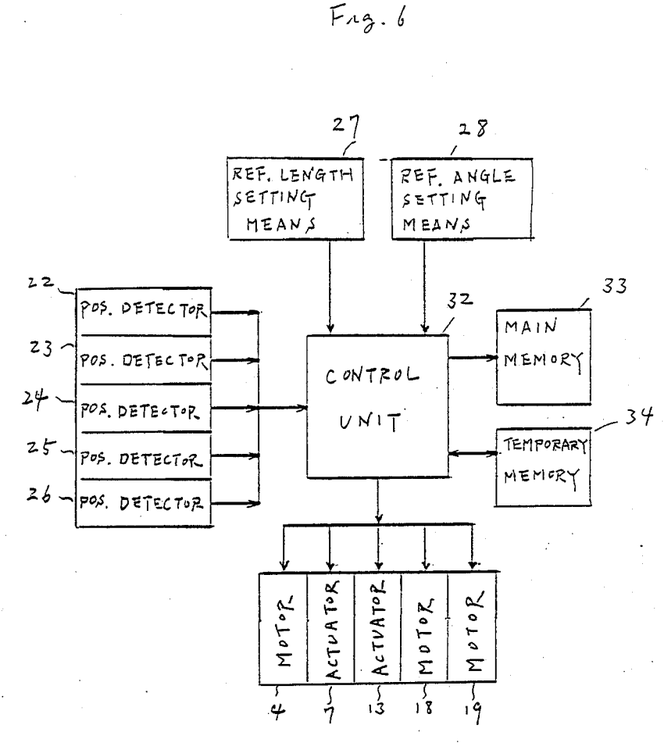
FIG. 6 is an illustration of a path teaching apparatus of a second embodiment of this invention.
Figure 7:
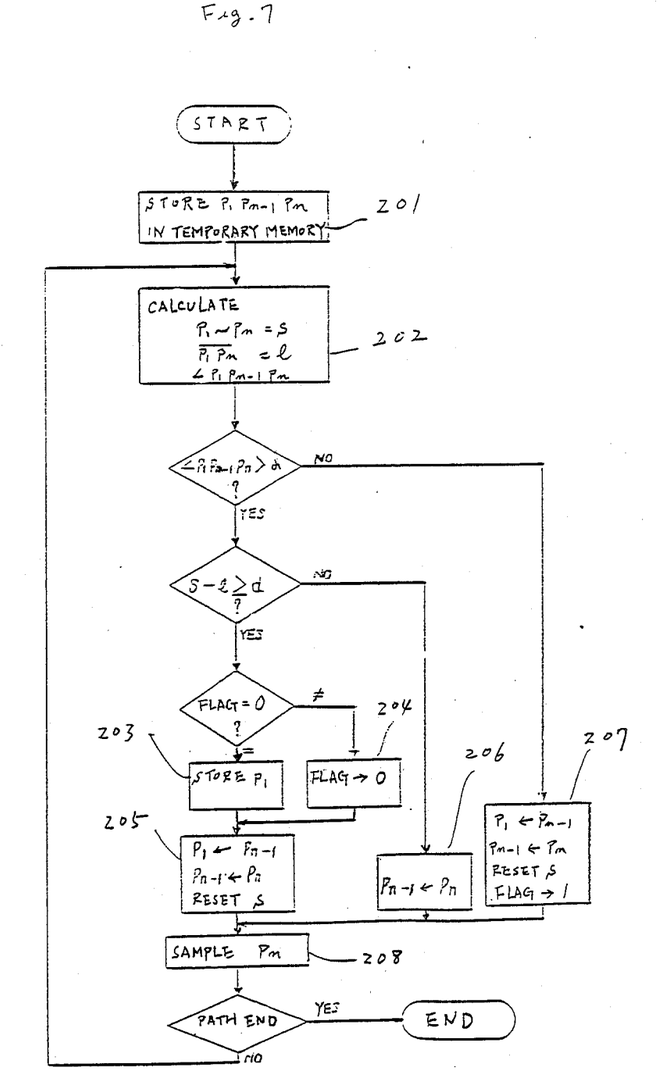
FIG. 7 is a flow chart of the second embodiment operation.

A further embodiment of the present invention is described with reference to FIGS. 6 through 8. Fundamentally, a path teaching apparatus for the second embodiment shown in FIG. 6 is the same as that described in connection with FIG. 2 with the exception that a main memory 33 and temporary memory 34 are employed as data storing means. Therefore, the reference numerals designaing corresponding parts are the same as those in FIG. 2.

The second embodiment of this invention is described hereinbelow with reference to FIG. 7.

A control unit 32 first computes the initial position point P1, the present position point Pn, and the point Pn−1 immediately prior to the present point Pn of a moving part, i.e., an applying gun 21, in response to outputs of position detectors 22 to 26. Unit 31 stores data relating to the respective points in the temporary memory 34 (step 201). Subsequently, the control unit 32 reads the data relating to the initial position point P1 from the temporary memory 30 in order to compute a straight distance l between the initial point P1 and the present point Pn. Here, the present point Pn is indicative of the $n^{th}$ sampling point with respect to the point P1. The points are sampled whenever the applying gun 21 moves by a predetermined distance. The control unit 32 reads out the data relating to the point Pn−1 from the temporary memory 34 to compute a reads path distance S' between the points Pn and Pn−1, and reads the path length S between the points P1 and Pn−1 from the temporary memory 34 so that the path distance S' is added to the path length S. The sum of the path distance S' and the path length S is stored in the memory 34 as a path length between the points P1 and Pn, thereby updating the path length stored in the memory 34. Furthermore, the control unit 32 reads the data relating to the points P1, Pn−1 and Pn to calculate an angle θ (∠P1Pn−1Pn) between the straight line that connects the point P1 with the point Pn−1 and the straight line that connects the point Pn−1 with the point Pn (step 202). When the angle θ is greater than a reference angle α given by a reference angle setting means 28, the following steps are performed.

(1) The control unit 32 determines the difference between the path length S and a straight line distance from the point P1 to the point Pn and compares the difference therebetween with a reference length d set, stored and derived by a reference length setting means 27. When the difference therebetween is greater than the reference length d, a decision flag stored in memory 34 is checked. The decision flag is set to "1" whenever the angle θ is smaller than the reference angle α. If the decision flag is "0", the data relating to the point P1 is stored in the main memory 33 (step 203). If the decision flag is "1", the flag is reset to "0" (step 204). Thereafter, the path length S, stored in the memory 34, is rewritten as path distance S' between the points Pn−1 and Pn, and the point Pn−1 is stored in the memory 34 as an initial point P1 and the point Pn is stored therein as a previous point, i.e., Pn−1, (step 205). When the difference between the path length S and the straight distance 1 is smaller than the reference length d, the present point Pn is stored in the memory 34 as a point of one before the present point (step 206).

On the other hand, if the angle θ is smaller than the reference angle α, the following steps are performed.

(2) The control unit 32 replaces the path length S, stored in the memory 34, with the distance S' between the points Pn−1 and Pn, and stores the point Pn−1 as an initial point P1 and also stores the point Pn as a point of one before the present point. At the same time, the decision flag in the memory 34 is set to "1" (step 207).

Subsequently, the control unit 32 computes a new present point of the applying gun 21 in response to outputs of the position detectors 22 to 26 (step 208). The above-described operation is repeatedly performed until termination of the teaching path.

Accordingly, in the second embodiment, only the point P1 is stored as path data when the angle θ is greater than the reference angle α and the difference between the path length and straight line distance is greater than reference length d. On the other hand, none of the points P1, Pn−1 and Pn is stored as path data when the angle θ is smaller than reference angle α, resulting in smoothly tracing the rapidly curved portions of the teaching path which are caused by the vibration of operator's hand, because points are not stored as path data in the vicinity of the rapidly curved portions.

Figure 8:
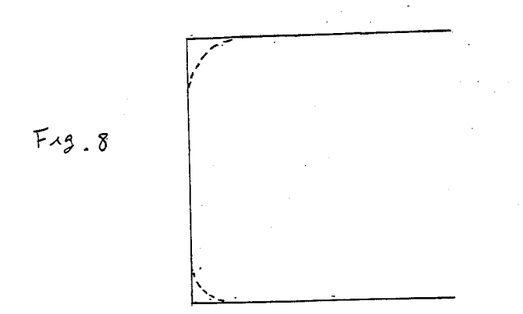
FIG. 8 is a graphic diagram of a result obtained in accordance with the second embodiment.

One example performed in accordance with the second embodiment is illustrated in FIG. 8 wherein a teaching path is indicated by a solid line and a traced path is indicated by a dotted line. Similarly, the playback is performed on the basis of Akima's method. It will be understood from the figure that the highly curved portions of the teaching path are traced smoothly because a teaching point is not provided in the vicinity of rapidly curved portions of the teaching path. The second embodiment is adapted for the case that it is not required to accurately trace a teaching path or that it is required to prevent the vibration of operator's hand from adversely affecting a path teaching.

It should be understood that the foregoing relates to only preferred embodiment of the present invention, and that it is intended to cover all changes and modifications of the embodiments of this invention herein used for the purpose of the disclosure, which do not constitute departures from the spirit and scope of this invention.

What is claimed is:

1. In a control system having a memory for controlling the movement of a moving part of a working apparatus so that said moving part is moved to trace a predetermined path, a method of successively obtaining tracing points on said path as path data for teaching said moving part to be moved substantially along said path by successive tracing of the tracing points, comprising the steps of:
   (a) moving a position feeler along said path and monitoring the position of the feeler at first, second and third sampling points along said path;
   (b) obtaining a difference between a path length and a straight distance between the first and second sampling points on said path in response to the monitored positions at the first and second sampling points;
   (c) determining a curvature of said path on the basis of an angle formed by said first and second sampling points and said third sampling point on said path in response to the monitored positions at the first, second and third points; and
   (d) selectively storing said first, second and third sampling points as said tracing points in said memory on the basis of the obtained difference and the determined curvature.

2. A method as claimed in claim 1, wherein step (c) comprises:
   storing said first, second and third sampling points in said memory when said angle made by said three sampling points is smaller than a reference angle.

3. A method as claimed in claim 1, wherein the step (c) comprises:
   storing said first and second sampling points when said angle made by said three sampling points is greater than a reference angle.

4. In a control system having a memory for controlling the movement of a moving part of a working apparatus so that said moving part is moved to trace a predetermined path, a method of successively obtaining tracing points on said path as path data for teaching said moving part to be moved substantially along said path by successive tracing of the tracing points, comprising the steps of:
   (a) moving a position feeler along said path and monitoring the position of the feeler at a basic point P1, a second sampling point Pn and a third sampling point Pn+1 along said path;
   (b) calculating a path length between said basic point P1 and said second sampling point Pn on said path in response to the monitored positions at points P1 and Pn;
   (c) calculating a straight distance between said basic point P1 and said second sampling point Pn on said path in response to the monitored positions at points P1 and Pn;
   (d) calculating a difference between the calculated path length and straight distance;
   (e) storing said second sampling point Pn in said memory as the tracing point following said basic point when said difference is greater than a reference length;

(f) when reaching the third sampling point Pn+1 second to said second sampling point Pn, calculating an angle between a straight line that connects said second sampling point Pn and a straight line that connects said second sampling point Pn with said third sampling point Pn+1; and (g) storing said third sampling point Pn+1 as a new basic point when said calculated angle is smaller than a reference angle, and setting said second sampling point Pn as a new basic point when said calculated angle is greater than said reference angle.

5. A method as claimed in claim 4, further comprising a step of successively advancing said path without storing said second point when said difference is smaller than said reference length.

6. In a control system having a memory for controlling the movement of a moving part of a working apparatus so that said moving part is moved to trace a predetermined path, a method of successively obtaining tracing points on said path as path data for teaching said moving part to be moved substantially along said path by successive tracing of the tracing points, comprising the steps of:
(a) moving a position feeler along said path and monitoring the position of the feeler at first, second and third sampling points along said path;
(b) responding to the monitored positions of the first, second and third points to determine a curved condition of said path on the basis of an angle made by said first, second and third sampling points on said path and a difference between a path length and a straight distance from said first sampling point to said third sampling point; and
(c) performing teaching control such that said first sampling point is stored as the path data in said memory when the angle is greater than a reference angle and the difference is greater than a reference length, none of the first to third sampling points being stored in said memory when the angle is smaller than said reference.

7. In a control system having a temporary memory and a main memory for controlling the movement of a moving part of a working apparatus so that said moving part is moved to trace a predetermined path, a method of successively obtaining tracing points on said path as path data on teaching of said path to cause said moving part to be substantially moved along said path by successive tracing of the tracing points, comprising the steps of:
(a) moving a position feeler along said path and monitoring the position of the feeler at a basic point P1, a second sampling point Pn−1 and a third sampling point Pn along said point;
(b) responding to the monitored positions of the basic, second and third sampling points P1, Pn−1 and Pn to store said basic, second and third sampling points Pn1, Pn−1 and Pn on said path in said temporary memory, said second sampling point Pn−1 being a point sampled immediately prior to said third sampling point;
(c) calculating an angle made by said basic, second and third sampling points P1, Pn−1 and Pn on said path;
(d) calculating length along the path between said basic and third sampling points P1 and Pn;
(e) calculating a straight distance between said basic and third sampling points P1 and Pn;
(f) calculating a difference between the calculated length path along the path and the calculated straight distance when the calculated angle is greater than a reference angle; and
(g) when the calculated difference is greater than a reference length, storing said basic sampling point P1 in said main memory, storing said second sampling point Pn−1 as a new basic sampling point in said temporary memory, and storing said third sampling point Pn in said temporary memory, and, when the calculated difference is smaller than said reference length, storing said second sampling point Pn−1 in said temporary memory without storing said basic sampling point P1 in said main memory, said basic sampling point P1 stored in said main memory being used as said path data.

8. A method as claimed in claim 7, further comprising the step of storing said second sampling point Pn−1 as a new basic sampling point in said temporary memory when the calculated angle is smaller than said reference angle.

9. In a method of controlling the movement of a moving part of a working apparatus to cause said part to move along a predetermined path comprising the steps of:
(1) moving a position feeler along a path to be duplicated by the working apparatus moving part, monitoring the position of the feeler at successive sampling points along the path over which the feeler is moved,
(2) determining from the sampled points which of said sampled points are to be stored to control the movement of the moving part,
said step (2) comprising:
 (a) determining the difference in length along the path of the feeler between first and second of the sampled points and the straight line distance between said first and second points,
 (b) determining the curvature of said path in response to an angle formed by said first and second sampling points and a third point along the path of the feeler, the third point being after the second point,
 (c) selecting at least one of the first, second and third points as at least one point to be stored only in response to the determined difference and curvature having values in a predetermined range,
 (d) in response to the determined difference and curvature not having values in said predetermined range repeating steps (a), (b), and (c) for additional points along the path after the third point while retaining at least one of said first points until the determined difference and curvature between said at least one retained point and two other points along the path have said at least predetermined values,
(3) storing the points selected during step (2); and
(4) controlling the movement of the moving part in response to the stored values.

10. The method of claim 9 further including interpolating between the stored values the movement of the moving part being controlled in response to the interpolation between the stored values.

11. The method of claim 10 wherein the points are selected in response to said length difference exceeding a reference length and an angle formed by a straight line connecting the first and second points and a second line connecting the second and third points having a predetermined range of values.

12. The method of claim 9 wherein
(a) the first, second and third points are selected in response to said length difference exceeding a reference length and an angle formed by a straight line connecting the first and second points and a second line connecting the second and third points being smaller than a reference value,
(b) the first and second points are selected to the exclusion of the third point in response to said length difference exceeding the reference length and the angle formed by a straight line connecting the first and second points and a second line connecting the second and third points being greater than the reference value.

13. The method of claim 12 further including interpolating between the stored values, the movement of the moving part being controlled in response to the interpolation between the stored values.

14. The method of claim 9 wherein:
(a) the first point is selected in response to said length difference exceeding a reference length and an angle formed by a straight line connecting the first and second points and a second line connecting the second and third points being greater than a predetermined value, and
(b) selecting none of the first, second and third points in response to said angle being less than the predetermined value.

15. The method of claim 14 further including interpolating between the stored values, the movement of the moving part being controlled in response to the interpolation between the stored values.

16. The method of claim 9 wherein the points are selected in response to said length difference exceeding a reference length and an angle formed by a straight line connecting the first and second points and a second line connecting the second and third points having a predetermined range of values.

17. A movement-controlling apparatus comprising:
movable working means for performing a predetermined work task by moving along a predetermined path;
movement-controllable means coupled to said movable working means to be driven in response to a control signal for controlling movement of said movable working means;
position sensor means for sensing a position of said movable working means and generating a position signal indicative of the sensed position of said movable working means; and
control means responsive to said position signal derived by said position sensor means for controlling movement of said movable working means and for determining tracing points so that a locus formed by successively tracing said tracing points becomes substantially coincident with said predetermined path for moving said movable working means, said control means including memory means for storing the determined tracing points and generating said control signal for said movement-controllable means so that said movable working means successively traces said tracing points, said control means being programmed to perform the tracing-point determining steps of:
(a) successively sampling positions of said movable working means in response to said movable working means being moved along said predetermined path;
(b) calculating the difference between the path length from a first sampling position to a second sampling position along the path and a straight distance between said first and second sampling positions;
(c) comparing the difference calculated in step (b) with a predetermined value; and
(d) when the difference calculated in step (b) is greater than said predetermined value, storing said second position as one of the tracing points.

18. The movement-controlling apparatus of claim 17, wherein said control means also stores a third position as the next tracing point when an angle formed by a said pair of lines including said first and third positions and another point is smaller than a predetermined angle.

19. A movement-controlling apparatus comprising:
movable working means for performing a predetermined work task by moving along a predetermined path;
movement-control means coupled to said movable working means adapted to be driven in response to a control signal for controlling movement of said movable working means;
position sensor means for sensing the position of said movable working means and deriving a position signal indicative of the sensed position of said movable working means; and
control means responsive to said position signal derived from said position sensor means for controlling the movement of said movable working means and for determining tracing points so that a locus formed by successively tracing said tracing points becomes substantially coincident with said predetermined path for the movement of said movable working means, said control means including temporary memory means and main memory means for storing the predetermined tracing points and deriving said control signal for said movement-control means so that said movable working means successively traces said tracing points, said control means being programmed to perform the tracing-point determining steps of:
(a) successively sampling positions of said movable working means in response to said movable working means being moved along said predetermined path;
(b) storing first, second and third sampling positions along said path, said second sampling position being between said first and third positions along said path;
(c) calculating an angle made by a pair of straight lines including said first, second and third sampling positions;
(d) calculating path length along said path between said first and third sampling positions;
(e) calculating the distance between said first and third sampling positions along a straight line between said first and third sampling positions;
(f) calculating the difference between the calculated path length and the calculated straight line distance only if the calculated angle is greater than a predetermined angle; and
(g) when the calculated difference is greater than a predetermined length: (i) storing said first sampling position in said main memory means as one of said tracing points, and (ii) storing said second sampling position in said temporary memory means for use as a new first sampling position.

* * * * *